Nov. 12, 1929.    H. NYQUIST    1,735,052
PHASE COMPENSATING NETWORKS
Original Filed Feb. 25, 1926    2 Sheets-Sheet 1
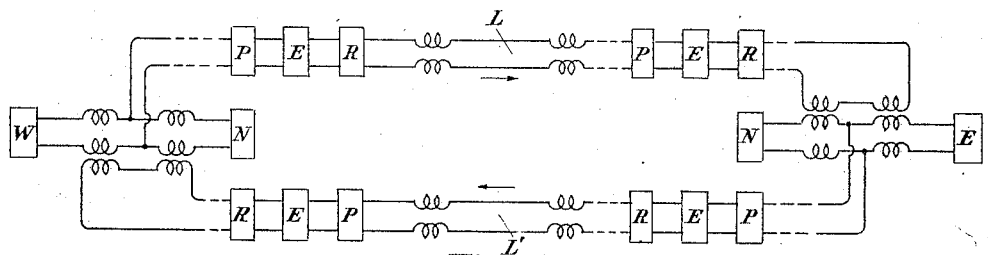
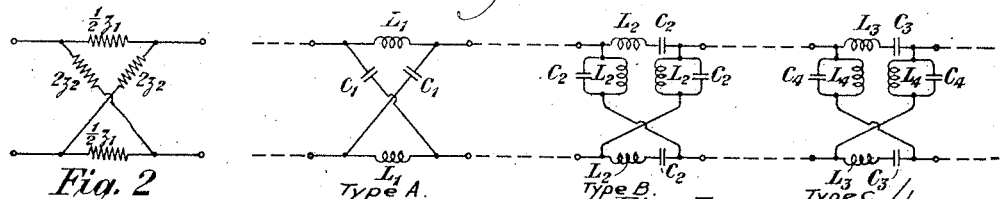
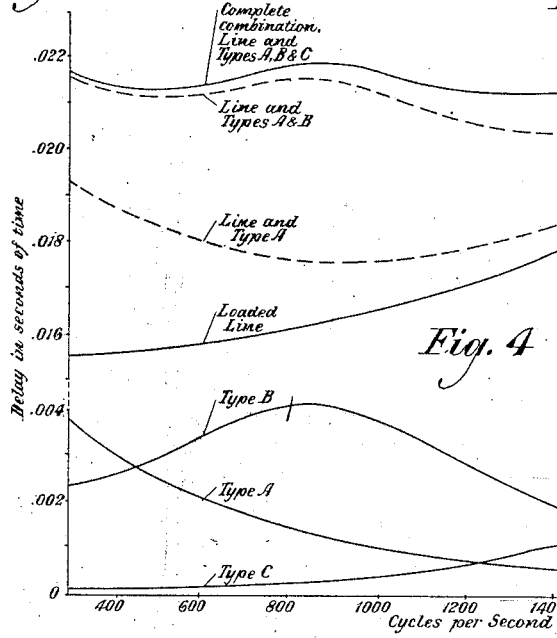
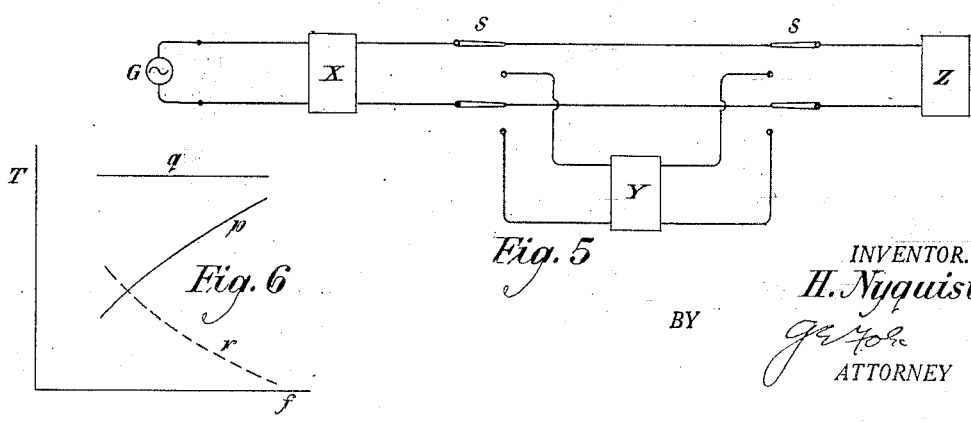
INVENTOR.
H. Nyquist
BY
ATTORNEY Nov. 12, 1929.                H. NYQUIST                1,735,052
                      PHASE COMPENSATING NETWORKS
                  Original Filed Feb. 25, 1926    2 Sheets-Sheet 2
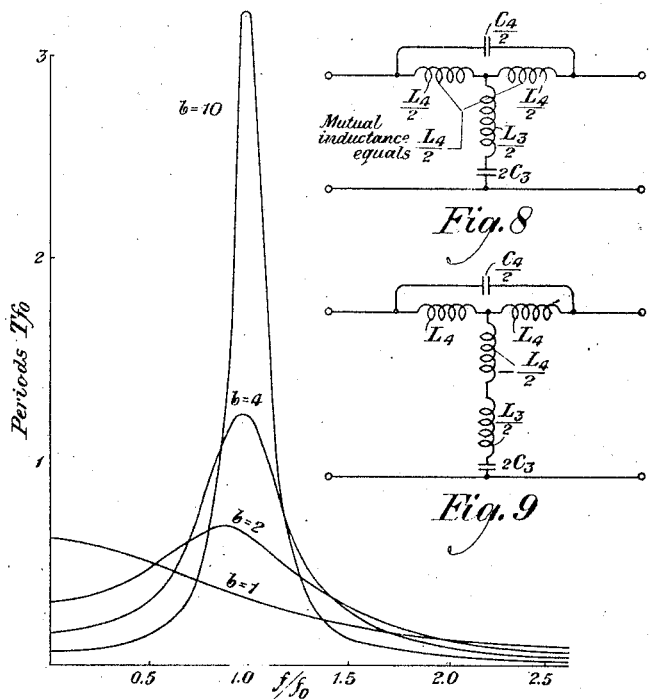
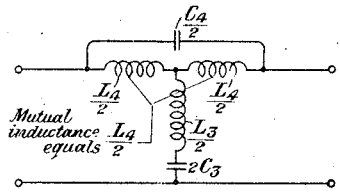
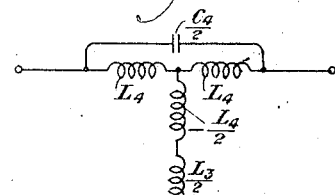
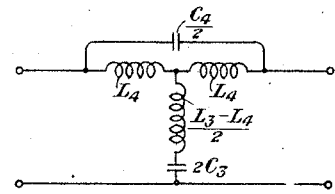
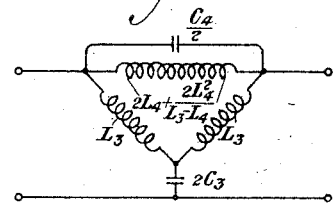
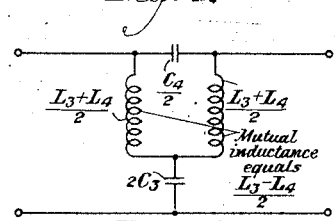
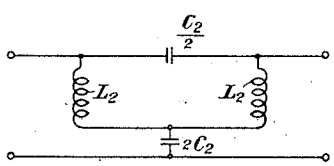
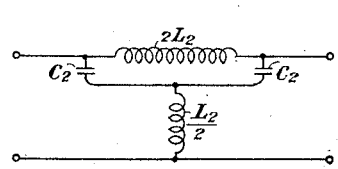
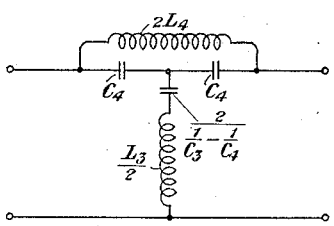
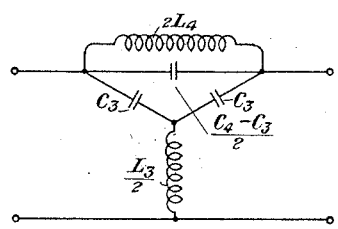
INVENTOR.
H. Nyquist
BY
ATTORNEYS.

Patented Nov. 12, 1929

1,735,052

UNITED STATES PATENT OFFICE

HARRY NYQUIST, OF MILLBURN, NEW JERSEY, ASSIGNOR TO AMERICAN TELEPHONE AND TELEGRAPH COMPANY, A CORPORATION OF NEW YORK

PHASE-COMPENSATING NETWORKS

Original application filed February 25, 1926, Serial No. 90,656. Divided and this application filed August 5, 1927. Serial No. 210,946.

This application is a division of my application Serial No. 90,656, filed February 25, 1926, for Phase compensating networks.

An object of my invention is to provide a new and improved electrical transmission system in which the frequency components of the current within a certain desired frequency range will be in the same phase relation with one another at the receiving end as at the transmitting end. Another object of my invention is to make the received composite wave form in such a system of the same shape as the transmitted wave form. Another object is to provide for a desired displacement in time of the respective frequency components of a composite alternating current. Another object is to provide for a suitable phase shift of currents of different frequencies in a circuit so as to bring them into a desired phase relation. Another object is to provide for a relative phase shift of the frequency components in a transmission line to compensate for a normal phase shift in the line and to restore the components at the receiving end of the line to the same phase relation as though no line phase shift were present. Another object is to provide a transducer to operate in tandem with a transmission line that shall compensate the distortion due to differential phase shift on the line. Still another object is to provide a transducer to compensate for distortion due to a greater phase shift at high and low frequencies than at an intermediate frequency. In the following specification with the accompanying drawings I disclose specific examples of practice according to my invention. It will be understood that the specification relates largely to these particular cases and that the invention is defined in the appended claims.

By the word "transducer" as employed in this specification, I mean any apparatus having a pair of input terminals for applied electromotive force and a pair of output terminals by which electromotive force may be applied to another element, the output being a function of the input.

Referring to the drawings, Figure 1 is a symbolic diagram of a four-wire transmission system embodying my invention; Fig. 2 is a diagram of a general network of which special forms may be employed in embodying my invention; Fig. 3 is a diagram of a particular network used in an embodiment of my invention here disclosed by way of illustration; Fig. 4 is a diagram of delay-frequency characteristics to which reference will be made in explaining the principle of my invention, and the procedure for embodying it in a particular case; Fig. 5 is a diagram showing the relation of my improved delay network to other elements of the system; Fig. 6 is a diagram showing delay as a function of frequency for certain transducers; Fig. 7 gives a family of delay-frequency characteristics that may afford guidance in the design of a suitable network in a particular case; Figs. 8 to 12, inclusive, show bridged-T network sections equivalent to Type C of Fig. 3; Figs. 13 and 13$^a$ show bridged-T sections equivalent to Type B of Fig. 3; Figs. 13$^b$ and 13$^c$ show bridged-T sections equivalent to Type C of Fig. 3.

The stations W and E of Fig. 1 are connected in a four-wire system by the two loaded lines L and L' in each of which occasional repeaters R are interposed. On the input side of each repeater R there are interposed a network P and an attenuation equalizer E intended to correct for distortion due to differential phase shift and attenuation on the line. Voice frequency currents put on the line L at station W go to the first repeater station, and then they pass through the phase distortion equalizer P which compensates for the differential retardation of the components of the various frequencies by further retarding them unequally so that they are brought to the same time relation to each other as at the sending end. Then the currents pass through the attenuation equalizer E and then through the amplifier R, and so on at each repeater station.

I will first assign specific values for the constants of a certain line and will give the specific design for the network of my invention in this instance, and thereafter I will discuss the principles on which this design is based and point out certain other examples of practice of the invention.

The line chosen for this first example is taken as a one-way No. 19 gauge medium heavy loaded cable circuit, 154 miles long, with a repeater at the middle and at the receiving end, and with a phase compensating network at the receiving end. The constants of the loaded line are:

Resistance $R_0 = 95.5$ ohms per mile at 1000 cycles per second;
Inductance $L_0 = 0.154$ henry per mile;
Capacity $C_0 = 0.065$ microfarad per mile;
Interval between loads $= 1.136$ miles.

Assume that a wave train of a certain pure frequency $f$ ($= w/2\pi$) is applied suddenly at one end of this line. As is well known, the received current at the other end will build up somewhat gradually. Let the time from the instant the sending current is applied until the received current reaches one-half its full steady-state value be represented by the letter T. This time T as a function of frequency $f$ is shown by the curve marked "Loaded line" in Fig. 4. It will be seen that the delay is greater for the higher frequencies of the essential voice range.

The appropriate phase equalizing network of Fig. 3 consists of sections of three different types, eight sections of Type A, six sections of Type B and one section of Type C. All these sections are special cases of the general crossed or lattice network of Fig. 2. The respective inductances and capacities in the network of Fig. 3 have the values given in the following table:

$L_1 = 0.5$ henry;
$C_1 = 0.2$ microfarad;
$L_2 = 0.25$ henry;
$C_2 = 0.1$ microfarad;
$L_3 = 0.42$ henry;
$L_4 = 0.059$ henry;
$C_3 = 0.024$ microfarad;
$C_4 = 0.17$ microfarad.

The eight sections of Type A by themselves have a delay-frequency characteristic as shown by the curve marked "Type A" in Fig. 4. When they are in tandem with the line, the resultant characteristic is shown by the dotted curve marked "Line and Type A."

It will be seen that the characteristic for the loaded line alone slopes up to the right and is concave up, and the characteristic for the Type A network slopes down to the right and is concave up, and the resultant characteristic shown in dotted lines has an intermediate minimum. The additional sections of Type B and Type C are designed so that, by themselves, they give intermediate maxima, as shown in Fig. 4, and the entire combination gives an approximately horizontal characteristic curve as designated "Complete combination" in Fig. 4. This means that for all the frequency components within the essential voice range the delay in transmission is approximately the same, that is, between about 0.021 and 0.022 second of time.

Referring to Fig. 5, let X be any transducer between the source G and the receiver Z. The delay-frequency characteristic of the transducer X over a certain frequency range will have a certain form, for example, as shown by the curve $p$ in Fig. 6. Suppose it is desired that the currents shall go to receiver Z with their components of different frequency in the same time relation as at the generator G, in other words, so that all the components will be delayed equally and at the receiver the delay-frequency curve will be a horizontal line such as $q$. This effect will be obtained by interposing a compensator whose characteristic $r$ is complementary to $p$ as shown in Fig. 6.

If the characteristic of the transducer X slopes up to the right as at $p$ in Fig. 6, then the compensator Y should have a characteristic sloping down to the right as at $r$. Sections of crossed type network, such as those of Type A in Fig. 3, answer to this requirement, as will be seen by comparing curve $r$ in Fig. 6 with the curve for Type A in Fig. 4.

For a series of network sections like the one shown generally in Fig. 2, and with the impedance values indicated thereon, the propagation constant $\Gamma$ and the characteristic impedance K are given by the following formulas:

$$\cosh \Gamma = 1 + 2z_1/(4z_2 - z_1) \quad (1)$$

$$K = \sqrt{z_1 z_2} \quad (2)$$

It is desirable that the characteristic impedance shall be a real constant K, and approximately the same as the impedance (resistance) of the elements with which the network is connected on the input and output sides. Assuming that the impedances $z_1$ and $z_2$ are dissipationless, that is made up only of reactance elements, this result is secured by making $$z_1 = Kz \text{ and } z_2 = K/z \quad (3)$$

where K is a real constant and where $z$ is a pure reactance. A network of the type of Fig. 2 with K constant is called a "constant K" network. Substituting in 1, it follows that $$\cosh \Gamma = 1 + \frac{2z}{\frac{4}{z} - z} \quad (4)$$

A familiar formula of hyperbolic trigonometry is $$\tanh \Gamma/2 = \sqrt{\frac{\cosh \Gamma - 1}{\cosh \Gamma + 1}} \quad (5)$$

Substituting from (4), this reduces to $$\tanh \Gamma/2 = z/2. \quad (6)$$

In general, the propagation constant $\Gamma$ may be put equal to $\alpha + i\beta$, where $\alpha$ is the attenuation constant and $\beta$ is the phase shift constant. The structure for $z$ is of reactance elements only and on this basis it follows from equation (6) that $\alpha=0$ and that $$i \tan \beta/2 = z/2. \quad (7)$$

For the sections of Type A of Fig. 3, this gives $$\beta = 2 \tan^{-1} w\sqrt{L_1 C_1} \quad (8)$$

It is approximately true that $$T = d\beta/dw. \quad (9)$$

Hence by differentiating (8), the result is obtained that $$T = \frac{2\sqrt{L_1 C_1}}{1 + w^2 L_1 C_1} \quad (10)$$

By the aid of this equation, delay frequency characteristics can be drawn for respective values of the product $L_1 C_1$ and from them it can readily be determined what is the best value of $L_1 C_1$ and how many network sections are necessary to get such compensation as should be effective for the Type A sections. In this way, the number of sections for Type A in Fig. 3 has been fixed at eight, and the value of $L_1 C_1$ at $10^{-7}$. The value of $L_1$ and the dependent value of $C_1$ have been determined so that $\sqrt{L_1/C_1}$ equals the desired value of $K$, 1580 ohms.

For the sections of Type B or C, let the impedance $z$ be made up of a series resonant circuit so that $$\frac{z}{2} = iw\frac{b}{2w_0} + \frac{bw_0}{i2w}, \quad (11)$$

where $w = 2\pi f$, $f$ being the frequency, and $b$ and $w_0$ are parameters to which we may assign proper values, $w_0/2\pi = f_0$ being the resonance frequency. For the Type B network, $$b = 2 \text{ and } \sqrt{L_2/C_2} = K,$$

and the truth of Equation (11) will become apparent on noticing that $w_0 = 1/\sqrt{L_2 C_2}$, and substituting for $L_2$ and $C_2$ in terms of $b$ and $w_0$ in the equation $$\frac{z}{2} = \frac{z_1}{2K} = \frac{iwL_2 + 1/iwC_2}{K} = iw\sqrt{L_2 C_2} + \frac{1}{iw\sqrt{L_2 C_2}}$$

For the Type C network, $$w_0 = \frac{1}{\sqrt{L_3 C_3}} = \frac{1}{\sqrt{L_4 C_4}};$$

$$K = \frac{2}{b}\sqrt{\frac{L_3}{C_3}} = \frac{b}{2}\sqrt{\frac{L_4}{C_4}};$$

and $$b = 2\sqrt[4]{\frac{L_3 C_4}{C_3 L_4}}.$$

The truth of Equation (11) will become apparent in this case by substituting for $L_3$ and $C_3$ in terms of $b$ and $w_0$ in the equation $$\frac{z}{2} = \frac{z_1}{2K} = \frac{iwL_3 + 1/iwC_3}{K} = \frac{iwb\sqrt{L_3 C_3}}{2} + \frac{b}{2iw\sqrt{L_3 C_3}}$$

As before, with $\Gamma = \alpha + i\beta$, from Equations (6) and (11) it follows that $\tanh \Gamma/2 = \tanh i\beta/2 = (ib/2)(w/w_0 - w_0/w)$ (12)
whence $$\beta = 2\tan^{-1}(b/2)(w/w_0 - w_0/w) \quad (13)$$

Differentiating (13) and substituting in (9), $$T = \frac{(b/w_0)(1 + w_0^2/w^2)}{1 + (b^2/4)(w/w_0 - w_0/w)^2} \quad (14)$$

As $w$ increases from 0 to infinity, the numerator decreases always, but the denominator passes through a minimum at $w = w_0$. If $b$ is made sufficiently large, the fraction in (14) has a maximum near $w_0$. This is shown in Fig. 7, which also shows that by giving to $b$ increasing values, $T$ can be made to increase at its maximum with accompanying decrease of values away from its maximum, the area of the curve remaining constant. By increasing the number of sections of the network, $T$ can be increased over the whole range for $w$. Furthermore, $w_0$ may be chosen to put the maximum point at the right or left as may be desired.

Referring to Fig. 4, it is seen that after the compensation effected by Type A, this gives a minimum at or near 1000 cycles, or $w_0 = 2\pi 1000$. In Fig. 7 a series of curves is constructed with coordinates $f/f_0$ and $Tf_0$ instead of coordinates $f$ and $T$ as in Fig. 4. This is somewhat more convenient, and the curves of Fig. 7 can be utilized for any value of $w_0$. Plotted either way, the area of each curve for a single section is unity. Hence we can estimate from the diagrams what value of $b$ will be best and how many sections will be needful. In this way, the value $b = 2$ is chosen and six sections of Type B are found to be appropriate. Having chosen respective values for $K$, $w_0$ and $b$, it follows from (3) and (11) that $$z_1/2 = zK/2 = iwbK/2w_0 + bw_0 K/i2w;$$

and using the lettering of Fig. 3,
In Type C, series $L_3 = bK/2w_0$
series $C_3 = 2/bw_0 K$.
In Type B, since $b = 2$,
series $L_2 = K/w_0$
series $C_2 = 1/w_0 K$.

Also, $$2z_2 = \frac{2K}{z} = \frac{1}{iw\frac{b}{2Kw_0} + \frac{bw_0}{i2wK}}$$

and in Type C, shunt $C_4 = b/2Kw_0$
shunt $L_4 = 2K/bw$,
In Type B since $b = 2$,
shunt $C_2 = 1/Kw_0$
shunt $L_2 = K/w_0$.

It will be noticed that the value $b=2$ enables us to use inductances and capacities of the same values in the series and shunt combinations; this is the case for Type B.

The dotted curve in Fig. 4 marked "Line and Types A and B" gives the delay-frequency characteristic for the corresponding combination. This shows a dip at about 1400 cycles, and by the principles and methods already explained, the design is determined for another section designated Type C and this gives the resultant characteristic as shown in Fig. 4.

It has already been mentioned that each section of Type B or Type C contributes about a unit area to the curves of Figs. 4 or 7. Each Type A section contributes only about half a unit, but this is not necessarily to be looked on as a disadvantage, for the Type A sections have only half as many reactance elements as the others.

The general procedure is first to plot the delay-frequency characteristic of the transducer to be compensated as in the case of the curve marked "Loaded line" in Fig. 4. Then add sections like Type A in proper number and with properly chosen reactance values so as to bring the ends of the characteristic up somewhere nearly to the same level. Then add sections like Type B or C to raise the minimum dips in the curve up to nearly the level of the ends, and make the curve have nearly the same altitude all across the essential frequency range as for the uppermost curve of Fig. 4.

Referring again to the fact that each section of Type B or Type C contributes about a unit of area to the resultant curve of Fig. 4 or Fig. 7, (and half a unit for each section of Type A) it will readily be seen that this affords a guide as to the number of sections that may need to be employed. Having given the "loaded line" curve of Fig. 4, an ideal characteristic can be drawn higher up and the area between the two characteristics will give the number of sections of network that must be employed. The shorter the frequency range is made, the less the number of sections that will be required, but shortening the frequency range may impair the quality in one way while the addition of phase correcting network sections improves it in another way. Assuming that economy of apparatus, particularly network sections, is a desideratum, then it may be said that without unduly shortening the frequency range a resultant characteristic can be obtained which may be allowed to depart a little from the horizontal, and will require no more network sections than would be required to get a fully horizontal characteristic for a less frequency range. In other words, starting with a characteristic like that marked "loaded line" the optimum characteristic with proper economy of network sections will be a characteristic which extends over the whole desired frequency range but which slopes up a little at the right and thus requires a less number of network sections than would be necessary to attain a completely horizontal characteristic over the same frequency range. I have discovered that certain economies and other advantages are possible in the design and construction of differential phase compensators by use of modifications which require a smaller number of elements and yet which yield structures possessing the same flexibility or number of degrees of freedom as is present in the lattice structures of Fig. 3. Some of these modifications are shown in the application noted above, of which this application is a division and of those there shown certain ones are included herein.

I have found that the bridged-T network section of Fig. 8 is equivalent to the lattice Type C network section of Fig. 3. The equivalence is dependent upon giving the reactance elements the values indicated by the legends of Fig. 8 as compared with Type C of Fig. 3.

In Fig. 9 a substitution is made for the two coils of Fig. 8 having mutual inductance, and a system of three equivalent coils is introduced with no mutual inductance between the members. One of these coils has a negative inductance which, of course, has no physical counterpart. But provided that $L_3$ is greater than $L_4$, the network of Fig. 9 can readily be realized physically in the network of Fig. 10.

Fig. 11 is derived from Fig. 10 by the well-known substitution of a delta for the star connection.

Another equivalent for Fig. 10 is obtained in Fig. 12 by substituting for the star a transformer of proper inductance values to be the equivalent of the star.

If $L_3$ is made equal to $L_4$, then each of the four Figs. 9, 10, 11 and 12 reduces to Fig. 13, which is an equivalent bridged-T network for the lattice Type B network of Fig. 3.

The bridged-T network of Fig. 8 has the advantage over Type C of Fig. 3 in that the total number of coils has been reduced from 4 to 2 and the total number of condensers has been reduced from 4 to 2. In Fig. 12, only a single coil is used, subject to the condition that it has an inductance coupling less than unity, and thus it embodies two magnetic circuits and is theoretically the equivalent of two coils. Fig. 13 has the practical advantage that the two coils are equal and separate, which simplifies construction and design.

Fig. 13[a] is an alternative equivalent for Fig. 13 and Figs. 13[b] and 13[c] are further equivalents for Type C of Fig. 3.

What is claimed is:

1. In combination, a transducer giving different delays for different frequencies over a certain frequency range and a delay compensator consisting of bridged-T network sections.

2. In combination, a transducer giving different delays for different frequencies over a certain frequency range and a delay compensator consisting of bridged-T network sections, at least one of these sections giving a maximum of delay within said frequency range.

3. In combination, a loaded line and a phase compensator consisting of sections, some of which compensate most for the lower frequencies of the essential voice frequency range, and others of which give a maximum of compensation at an intermediate frequency, at least one of said sections being of bridged-T type.

4. In combination, a loaded line and a phase compensator consisting of sections, some of which compensate most for the lower frequencies of the essential voice frequency range, and others of which give a maximum of compensation at an intermediate frequency, the sections being of the bridged-T type.

5. In combination, a transducer giving different delays for different frequencies over a certain frequency range and a delay compensator consisting of bridged-T network sections, the values of the inductances and capacities thereof being determined by the inductances and capacities of an equivalent lattice type network.

6. In combination, a transducer giving different delays for different frequencies over a certain frequency range and a delay compensator consisting of bridged-T network sections, at least one of these sections giving a maximum of delay within said frequency range, the bridging member for the sections comprising an inductance.

7. In combination, a transducer giving different delays for different frequencies over a certain frequency range, and a delay compensator comprising one or more sections of bridged-T networks and having the same delay characteristic as a plurality of sections of lattice type network and retaining the same degree of flexibility as the lattice network, but consolidated to a smaller number of elements.

8. In combination, a transducer giving different delays for different frequencies over a certain frequency range and a delay compensator in combination therewith, said delay compensator comprising at least one section of a bridged-T network and composed of a certain number of reactance elements, the said reactance elements being adjusted in value to make the delay frequency characteristic of the compensator the same as of a series of lattice type network sections composed of a greater number of reactance elements and designed to compensate the delay in the said transducer.

In testimony whereof, I have signed my name to this specification this 2nd day of August, 1927.

HARRY NYQUIST.